United States Patent [19]

Fukunaga et al.

[11] Patent Number: 5,056,811
[45] Date of Patent: Oct. 15, 1991

[54] ACTIVELY CONTROLLED AUTOMOTIVE SUSPENSION SYSTEM WITH MUTUALLY INDEPENDENT HYDRAULIC SYSTEMS HAVING MUTUALLY DIFFERENT DAMPING CHARACTERISTICS FOR IMPROVING RESPONSE CHARACTERISTICS IN ACTIVE SUSPENSION CONTROL

[75] Inventors: Yukio Fukunaga, Zushi; Naoto Fukushima, Kamakura; Yohsuke Akatsu, Yokohama; Sunao Hano, Yokosuka, all of Japan

[73] Assignee: Nissan Motor Company, Limited, Yokohama, Japan

[21] Appl. No.: 472,443

[22] Filed: Jan. 24, 1990

[30] Foreign Application Priority Data

Jun. 12, 1986 [JP] Japan ................ 61-137108

[51] Int. Cl.$^5$ .............................................. B60G 11/26
[52] U.S. Cl. .................................... 280/707; 280/709; 280/714
[58] Field of Search ............... 280/702, 703, 707, 709, 280/710, 714

[56] References Cited

U.S. PATENT DOCUMENTS

| 4,216,977 | 8/1980 | Fujii ..................... 280/707 |
| 4,659,104 | 4/1987 | Tanaka et al. ................ 280/707 |
| 4,685,698 | 8/1987 | Klinkner et al. .............. 280/707 |

FOREIGN PATENT DOCUMENTS

| 0142947 | 5/1985 | European Pat. Off. . |
| 0193124 | 9/1986 | European Pat. Off. . |
| 6197317 | 10/1986 | European Pat. Off. ........... 280/707 |
| 219866 | 4/1987 | European Pat. Off. ........... 280/707 |
| 3518503 | 10/1986 | Fed. Rep. of Germany . |
| 2155207 | 9/1985 | United Kingdom ............... 280/707 |

OTHER PUBLICATIONS

J. M. Hamilton, "Computer-Optimized Adaptive Suspension Technology", IEEE Transations on Industrial Electronics, IE-32, No. 4, Nov., 1985, pp. 355–363.

*Primary Examiner*—Charles A. Marmor
*Assistant Examiner*—Tamara L. Finlay
*Attorney, Agent, or Firm*—Foley & Lardner

[57] ABSTRACT

An actively controlled suspension system has two hydraulic systems for generating damping force against the vibration to be transmitted between a vehicle body and a suspension member. One of the hydraulic systems is designed for absorbing relatively high frequency vibration generally input from the suspension member for preventing vibration from the suspension member from being transmitted to the vehicle body. The other hydraulic system is active on relatively low frequency of vibration generally input from the vehicle body upon change of attitude of the vehicle body. The other hydraulic system generates a fluid pressure suppressing the attitude change. A pressure control valve and a fluid pressure source may be incorporated in the second hydraulic system so that they may not be active when aforementioned one of the hydraulic system is active.

20 Claims, 5 Drawing Sheets

ACTIVELY CONTROLLED AUTOMOTIVE SUSPENSION SYSTEM WITH MUTUALLY INDEPENDENT HYDRAULIC SYSTEMS HAVING MUTUALLY DIFFERENT DAMPING CHARACTERISTICS FOR IMPROVING RESPONSE CHARACTERISTICS IN ACTIVE SUSPENSION CONTROL

This application is a continuation of application No. 07/060,856, filed June 12, 1987, now abandoned.

BACKGROUND OF THE INVENTION

1. Field of the Invention

The present invention relates generally to a suspension system for a vehicle. More specifically, the invention relates to an actively controlled automotive suspension system with improved response characteristics for actively controlling suspension characteristics according to vehicle driving conditions. More particularly, the invention relates to a control system for an automotive suspension system, which has higher response characteristics to vehicular vibration and attitude change for satisfactorily absorbing vibration input from a road wheel and suppressing attitude change, such as rolling, pitching bouncing.

2. Description of the Background Art

Generally, a typical construction of a suspension assembly comprises a suspension coil and shock absorber interposed between a vehicle body and a suspension member supporting a vehicular wheel, in order to constitute an automotive suspension system relation to the suspension member. The suspension coil spring generally resists against a load applied to maintain the vehicle body and the road wheel in a predetermined positional relationship to each other. On the other hand, the shock absorber is intended to damp or absorb vibrations transmitted between the vehicle body and the road wheel. The automotive suspension system may be further provided with a roll-stablizer for suppressing vehicular rolling motion.

Some of the many kinds of automotive suspension systems include hydraulic circuits associated with fluid chambers in hydraulic shock absorbers for controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce a damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

In order to provide an improvement, a positively or actively controlled automotive suspension system has been proposed in European Patent First Publication 01 93 124, published on Sep. 3, 1986, and assigned to the common owner of the present invention. The proposed positively controlled automotive suspension system comprises a hollow cylinder defining a chamber, a piston thrustingly received within the chamber of the cylinder and defining therein a first and second fluid chambers, both filled with a working fluid, the piston being free to move axially with the chamber, a fluid pressure source, a hydraulic circuit connecting the first and second fluid chamber and the fluid pressure source, a pressure control valve disposed within the hydraulic circuit and adapted to selectively establish and block fluid communication between the first and second fluid chambers and the fluid pressure source, means responsive to relative displacement between a vehicle body and a road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

Another type of active suspension system has been disclosed in 'Autocar' published by Haymarket Publishing Ltd., on Sep. 10, 1987. The disclosed system includes a single cylinder actuator which has a cylinder tube connected to the vehicle body and a piston with a piston rod connected to the suspension member. The cylinder actuator is connected to a hydraulic pressure source via an electromagnetic valve. The hydraulic cylinder is also connected to an accumulator via an orifice. With this construction, the pressurized fluid to absorb road shock and suppress attitude change of the vehicle body is supplied from the pressure source via the pressure control valve. This lowers responsibility response to pressure control in the hydraulic actuator.

In addition, since an engine-driven pump is employed for generating pressurized fluid flow, the extra engine load due to the load of the pump becomes substantial to lower the fuel economy of the engine.

SUMMARY OF THE INVENTION

Therefore, it is an object of the present invention to solve the problems in the prior art and to provide an active controlled suspension system which has substantially high response.

Another object of the invention is to provide an actively controlled suspension system which will reduce load for an automotive engine for generating fluid pressure for pressure control.

In order to accomplish the aforementioned and other objects, an actively controlled suspension system, according to the invention, has two hydraulic systems for generating a damping force against the vibration to be transmitted between a vehicle body and a suspension member. The first of the hydraulic systems is designed for absorbing relatively high frequency vibration generally input from the suspension member for preventing vibration from the suspension member from being transmitted to the vehicle-e body. The second hydraulic system is active at a relatively low frequency of vibration generally input from the vehicle body upon a change of attitude of the vehicle body. The other hydraulic system generates a fluid pressure suppressing the attitude change.

A pressure control valve and a fluid pressure source are incorporated in the second hydraulic system so that they may not be active when one of the hydraulic systems is active.

According to one embodiment of the invention, an actively controlled suspension system for an automotive vehicle comprises a suspension assembly interposed between the vehicle's body and a suspension member rotating supporting a road wheel, the suspension assembly including a variable pressure chamber which has variable pressure therein in response to vibration input to the suspension assembly, a first pressure adjusting means associated with the variable pressure chamber and responsive to vibration input from the suspension member, for adjusting pressure in the variable pressure chamber for absorbing vibration energy input to the suspension assembly, and a second pressure adjusting means associated with the variable pressure chamber and responsive to vibration input from the vehicle body, for adjusting pressure in the variable pressure chamber for suppressing change in vehicular attitude.

According to another aspect of the invention. an actively controlled suspension system for an automotive vehicle comprises a suspension assembly interposed between the vehicle's body and a suspension member rotatingly supporting a road wheel, the suspension assembly including a variable pressure chamber which has variable fluid pressure therein in response to vibration input to the suspension assembly, a first pressure adjusting means connected to the variable pressure chamber via a first path provided with a predetermined first flow restriction value for limiting fluid flow therethrough and responsive to vibration input from the suspension member, for adjusting pressure in the variable pressure chamber for absorbing vibration energy input to the suspension assembly, and a second pressure adjusting means connected to the variable pressure chamber via a second path provided with a second flow restriction value limiting fluid flow therethrough and variable depending upon the frequency of input vibration in such a manner that the second flow restriction value is smaller than that of the first restriction value when the vibration frequency is lower than a given frequency threshold and becomes greater than or equal to the first restriction value when the vibration frequency increases across the frequency threshold, the second pressure adjusting means being responsive to vibration having a frequency lower than the frequency threshold for adjusting pressure in the variable pressure chamber for suppressing change of vehicular attitude.

According to a further aspect of the invention, an actively controlled suspension system for an automotive vehicle comprises a suspension assembly interposed between the vehicle's body and a suspension member rotatingly supporting a road wheel, the suspension assembly including a variable pressure chamber which has variable fluid pressure therein in response to vibration input to the suspension assembly. a first pressure adjusting means connected to the variable pressure chamber via a first path provided with a predetermined first flow restriction value for limiting fluid flow therethrough and responsive to vibration input from the suspension member, for adjusting pressure in the variable pressure chamber for absorbing vibration energy input to the suspension assembly, and a second pressure adjusting means connected to the variable pressure chamber via a second path provided with a second flow restriction value limiting fluid flow therethrough and variable depending upon the frequency of input vibration in such a manner that the second flow restriction value is smaller than that of the first restriction value when the vibration frequency is lower than a given frequency threshold and becomes greater than or equal to the first restriction value when the vibration frequency increases across the frequency threshold, the second pressure adjusting means including an actuator operable for adjusting the fluid pressure in the variable pressure chamber, a sensor means for detecting change of vehicular attitude and producing a sensor signal indicative of vehicular attitude change magnitude, and a controller receiving the sensor signal for deriving a control value to adjust the fluid pressure in the variable pressure chamber to produce a control signal for operating the second pressure adjusting means for adjusting pressure in the variable pressure chamber for suppressing vehicular attitude change.

The first pressure adjusting means includes a pressure accumulator connected to the variable pressure chamber and a first flow restricting means interposed between the variable pressure chamber and the pressure accumulator for limiting flow of the fluid for absorbing the vibration energy. On the other hand, the second pressure adjusting means includes a pressurized fluid source, a circuit connecting the pressurized fluid source, a valve means for adjusting flow of pressurized fluid, and a controller detecting attitude change of the vehicle body for operating the pressure control valve for adjusting fluid pressure, in the variable pressure chamber for suppressing an attitude change of the vehicle body. The second adjusting means incorporates a second flow restricting means for restricting fluid flow between the variable pressure chamber and the pressure control valve, said second flow restricting means having a variable flow restriction rate variable depending upon vibration frequency so that the flow restriction rate becomes greater than that of the first flow restricting means when the vibration frequency is higher than a given value. The given value is set at a border frequency between a resonance frequency of the vehicle body and a resonance frequency of the suspension member as coupled with the road wheel.

The controller is connected to a detector detecting change of attitude of the vehicle body to produce an attitude change indicative signal indicative of magnitude of change of attitude, and the controller derives a control value for controlling the pressure control valve and controlling fluid pressure in the variable pressure chamber to produce a control signal for controlling the pressure control valve. In the preferred embodiment, the detector comprises an acceleration sensor monitoring bounding and rebounding acceleration of the vehicle body for producing a bounding and rebounding acceleration indicative signal. The controller integrates the bounding and rebounding acceleration indicative signal value for obtaining bounding and rebounding motion indicative value to derive the control signal value based thereon.

BRIEF DESCRIPTION OF THE DRAWINGS

In the drawings:

FIG. is a diagrammatical illustration showing the overall construction of the preferred embodiment of an automotive suspension system with a control system actively controlling the suspension system according to the present invention

FIGS. 4(A) and 4(B) are enlarged sections showing the detail of the hydraulic pressure control valve of FIG. 3, in which, FIG. 4(A) shows the valve position softening the shock absorber and FIG. 4(B) shows the valve position hardening the shock absorber.

DESCRIPTION OF THE PREFERRED EMBODIMENT

Figure 1:
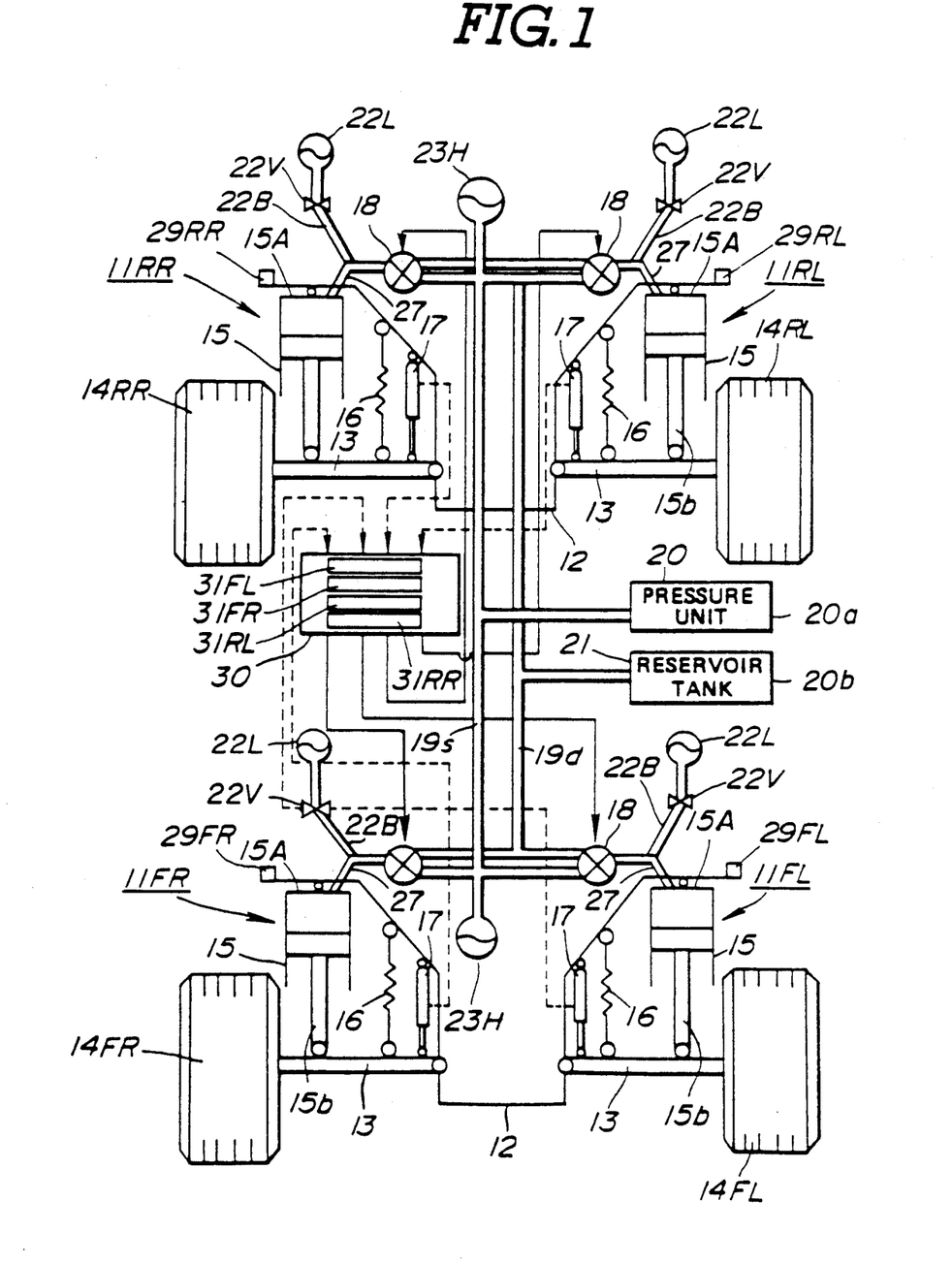

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR are constructed to a form so-called active suspension system which adjusts working fluid pressure in the suspension system for adjusting stiffness and damping characteristics of the suspension system in a positive manner for absorbing uncomfortable relatively high frequency and relatively small magnitude vibration input from the road wheels 14FL, 14FR, 14RL and 14RR and suppressing attitude change of a vehicle body.

Each suspension system 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator,, and a coil spring 16. In the shown embodiment shown, the suspension coil spring 16 is not necessary to damp the bounding and rebounding kinematic energy and is required only to resiliently support the vehicle body on the road wheel resisting the static load due to the mass weight of the vehicle body. In the further positive side, the suspension coil Spring 16 should be weak enough not to produce damping force against vibrations to be transmitted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a defines a variable pressure chamber which is connected to one section of the vehicle body 12. The lower end of the piston rod 15b is connected to the suspension member 13. Therefore, the piston 15c is thrustingly movable in bounding and rebounding directions relative to the cylinder housing 15a according to relative displacement between the vehicle body and the suspension member.

The hydraulic cylinder 15A of the suspension assembly 15 is connected to a fluid pressure source 20 via a hydraulic circuit which includes pressure control valve 18. The pressure control valve 18 employed in the shown embodiment is provided with an electrically operable actuator electrically operable according to a suspension control signal and connected to a control unit 30 to receive the suspension control signal therefrom. The hydraulic circuit includes a supply line 19s and a drain line 19d. High pressure accumulators 23H are connected to the supply line 19s and a low pressure accumulator 22L are connected between the pressure control valves 18 and the associated hydraulic cylinder 15A. The pressure source unit comprises a pressure unit 20a and a reservoir tank 20b. The pressure unit 20 is connected to the reservoir tank 20b suck the viscous working fluid in the reservoir tank 20b to feed to the pressure control valve 18 via the supply line 19s. On the other hand, the drain line 19d is connected to the reservoir 21 to return the working fluid thereto.

Figure 2:
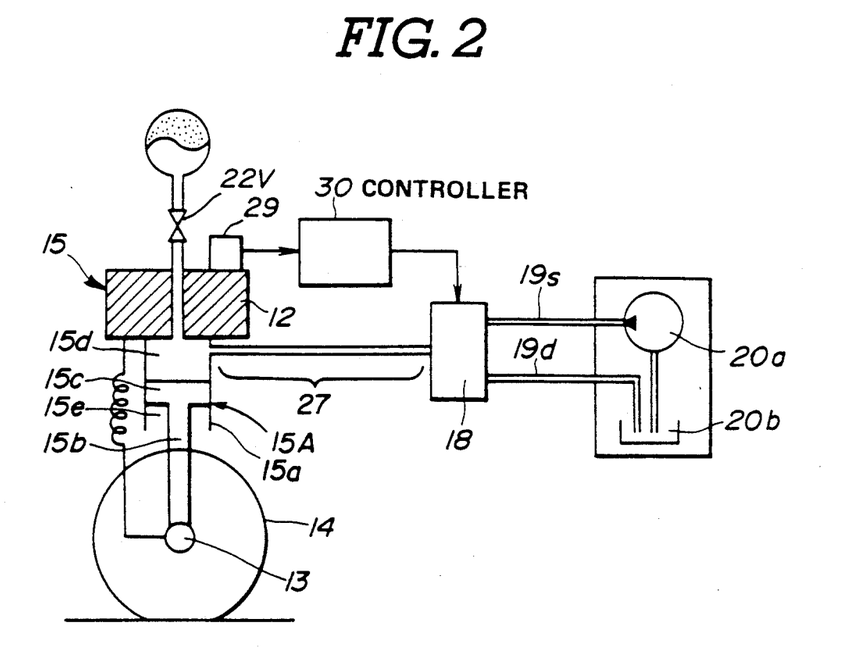
FIG. 2 is a diagramatic illustration of the preferred embodiment of one of the active suspension systems employed in the preferred embodiment of the actively controlled suspension system according to the invention.

As seen from FIGS. 1 and 2, the low pressure accumulators 22L are connected to a branch pressure line 22B connected to the communication path 27 between the pressure control valves 18 and the upper fluid chambers 15d of the hydraulic cylinders 15A. A throttle valve 22V defining a first flow restriction means, is inserted between the junction of the branch pressure line 22B and the communication path 27 and the low pressure accumulator 22L. The throttle valve 22V has a fixed throttling rate to provide a predetermined flow resistance against the working fluid flow therethrough.

The controller 30 is connected to a bounding and rebounding acceleration sensors 29FL, 29FR, 29RL and 29RR. The bounding and rebounding acceleration sensors 29FL, 29FR, 29RL and 29RR are respectively located just above the front-left, front-right, rear-left and rear-right wheels 14FL, 14FR, 14RL and 14RR to output bounding and rebounding acceleration indicative signals $\alpha_{FL}$, $\alpha_{FR}$, $\alpha_{RL}$ and $\alpha_{RR}$. The controller 10 derives the suspension control signals for controlling respective pressure control valves 18 based on the bounding and rebounding acceleration indicative signals $\alpha_{FL}$, $\alpha_{FR}$, $\alpha$RL and $\alpha_{RR}$.

Figure 3:
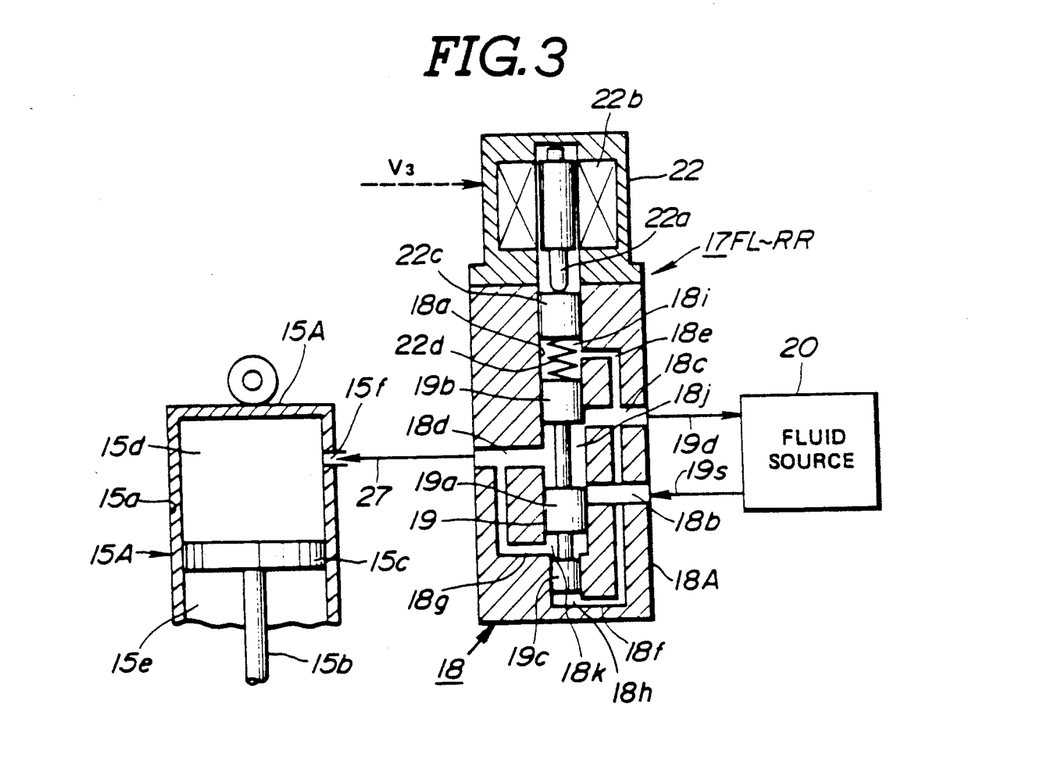
FIG. 3 is a section of one example of a hydraulic cylinder in combination with a hydraulic pressure control valve associated with the shock absorber for adjusting stiffness of the latter.

FIG. 3 shows the detailed construction of the hydraulic cylinder 15A and the pressure control valve 18 As will be seen from FIG. 3, the hollow cylinder housing 15a is formed with a port 15f communicating the upper fluid chamber 15d to an outlet port 18d of the pressure control valve 18 via a communication line 27. The pressure control valve 18 has a valve housing 18A having the forementioned outlet port 18d, an inlet port 18b and a drain port 18C. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 3, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and communicated with the upper fluid chamber 15d. On the other hand, the pressure chamber 18j shifts according to shifting of the valve spool 19 to selectively communicate with the inlet port 18b and the drain port 18c. A pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The spring force of the bias spring 22d balances with the hydraulic pressure in the pressure control chamber 18k to determine the valve spool position. The actuator piston 22c contacts with an actuator rod 22a of an electrically operable actuator 22 which comprises an electromagnetic solenoid 22b. The solenoid 22 is a proportioning solenoid which varies the magnitude of actuation of the actuator rod 22a to determine the valve spool position.

Figure 4:
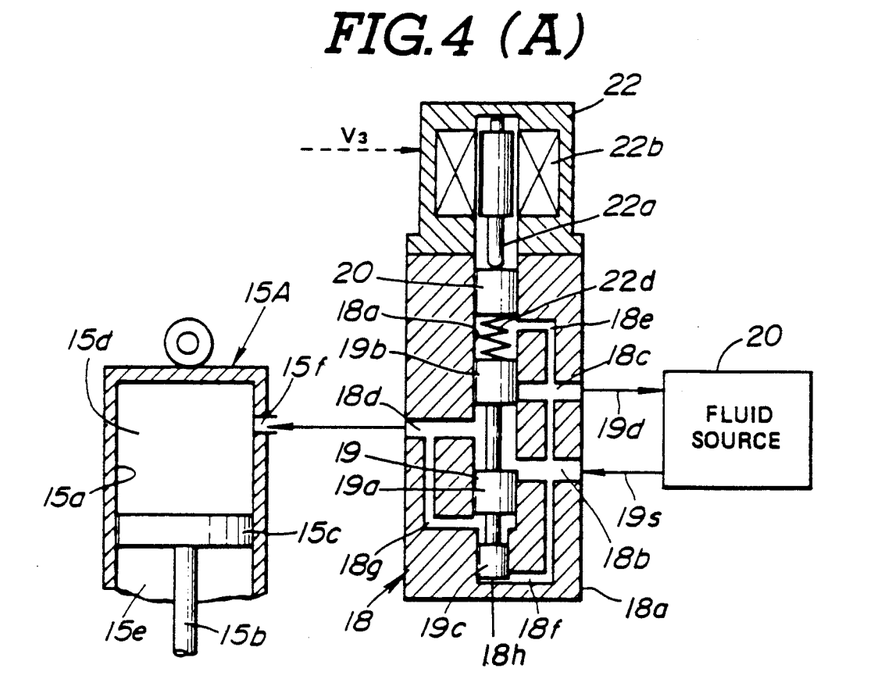

In order to increase the supply pressure of the working fluid, the spool valve 19 is shifted, to the position shown in FIG. 4(A) to increase the path area at a throttle constituted at the inner end of the inlet port 18b by means of the land 19a of the spool valve 19. On the other hand, in order to decrease the supply pressure of the working fluid, the spool valve is shifted to the position shown in FIG. 4(B) to decrease the path area at the throttle of the inner end of the inlet port 18b and opens the drain port 18c which, is normally blocked by means of the land 19b of the spool valve.

Construction of the pressure control valves should not be limited to the construction as illustrated in FIGS. 3, 4(A) and 4(B) but can be replaced with any appropriate constructions. For example, the pressure control valve constructions as illustrated in European Patent First Publication 01 93 124, set forth above, can also be employed. The disclosure of the aforementioned European Patent First Publication 01 93 124 is herein incorporated by reference for the sake of disclosure.

Figure 5:
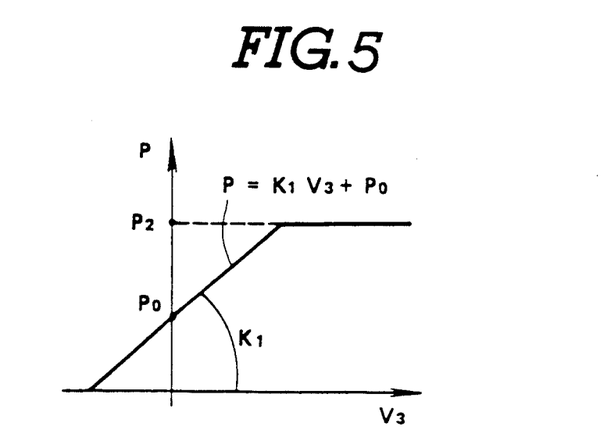
FIG. 5 is a graph showing variation of a hydraulic pressure to be supplied to a pressure control valve according to variation of drive signal voltage.

As seen from FIG. 3, the pro portioning solenoid 22 comprises the actuator rod 22a and a solenoid coil 22b. The solenoid coil 22b is energized by suspension control signal $V_3$ from the controller 30. The magnitude of energization is variable depending upon the signal level of the suspension control signal. Therefore, the proportioning solenoid 22 shifts the actuator rod in a magnitude proportional to the suspension control signal level. In the embodiment shown of the pressure control valve, the working fluid pressure P at the outlet port 18d is variable according to the characteristics shown in FIG. 5. Namely, when the suspension control signal $V_3$ is zero, the pressure P at the outlet port 18d becomes $P_0$ determined according to a predetermined offset pressure $P_0$. When the suspension control signal value increases in positive value the fluid pressure P at the outlet port 18d increases with a predetermined proportioning gain $K_1$. Namely, by increasing of the suspension control valve $V_3$, the actuator rod 22a is driven downwardly in FIG. 3 at a magnitude toward to position of FIG. 4(A) to achieve increasing of the fluid pressure with the predetermined proportioning gain $K_1$. The fluid pressure P at the outlet port 18d saturates at the output pressure $P_2$ of the pressure unit source 20. On the other hand, when the suspension control signal value $V_3$ decreases, the pressure P decreases to zero to by shifting of the actuator rod 22a toward the direction of FIG. 4(B).

The actuator rod 22a of the proportioning solenoid 22b is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 3. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

Figure 6:
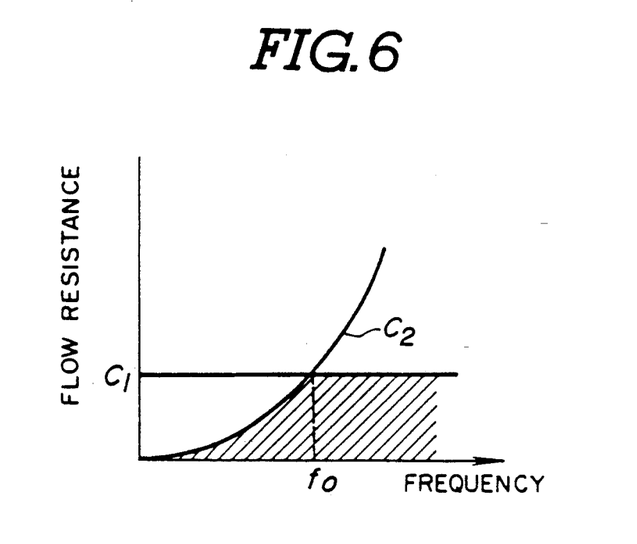
FIG. 6 is a graph showing variation of working fluid flow resistance in relation to a frequency of input vibration.

Here, the communication path 27, the outlet port 18d, the fluid chamber 15d of the hydraulic cylinder 15A and the pressure control valve 18 constitute the second hydraulic system defining a second pressure adjusting means. On the other hand, the low pressure accumulator 22L, the branch line 22B and the throttle valve 22V constitute the first hydraulic system with the fluid chamber 15d of the hydraulic cylinder 15A to define a first pressure adjusting means. The length and diameter of the pipe forming the communication path 27 is so selected as to generate a resistance CZ against the working fluid flow therethrough. The flow resistance C2 varies according to input vibration frequency which corresponds to the stroke speed of the piston 11c of the hydraulic cylinder 15A in a non-linear fashion. More practically, as shown in FIG. 6, the variation characteristics of the flow resistance $C_2$ in the communication path 27 exhibits parabolic characteristics in relation to the vibration frequency. Furthermore, the flow resistance value $C_2$ of the communication path is set smaller than the flow resistance $C_1$ in the first hydraulic system set forth above, when the input vibration frequency is lower than a border frequency $f_0$, (7 to 8 HZ) between the resonance frequency of the vehicle body and the resonance frequency of the suspension member as coupled with the road wheel. On the other hand, the flow resistance value $C_2$ of the communication path is set greater than or equal to the flow resistance $C_1$ in the first hydraulic system set forth above, when the input vibration frequency is higher than or equal to the border frequency $f_0$.

As will be appreciated, in general, the resonance frequency of the suspension member with the road wheel is higher than the resonance frequency of the vehicle body. Therefore, when the vibration is input from the suspension member, the vibration frequency is usually higher than the border frequency $f_0$. On the other hand, when the vehicle body causes rolling. pitching, bouncing or so forth to input vibration, the vibration frequency is lower than the border frequency.

Since the flow resistance of the communication path 27 becomes greater than that of the first hydraulic system when the vibration is input from the suspension member. Therefore, in this case, the first hydraulic system becomes active to absorb vibration energy. On the other hand, when the vibration frequency is lower than the border frequency $f_0$ during vehicular attitude change, such as vehicular rolling, pitching and bouncing and so forth, the first hydraulic system is active to adjust the fluid pressure in the fluid chamber 15d to suppress attitude change of the vehicle body.

For example, when bounding motion occurs at the suspension member, the piston 15c of the hydraulic cylinder 15A shifts upwardly to cause increasing of the fluid pressure in the upper chamber 15d. Since the input vibration frequency is higher than the border frequency, the increased pressure is introduced into the low pressure accumulator 22L through the throttle valve 22V because the first hydraulic circuit has lower flow resistance $C_1$ than that of the first hydraulic circuit. In this case, the throttle valve generates a damping force against the piston stroke to successfully prevent the vibration energy input from the suspension member from being transmitted to the vehicle body.

Therefore, in response to the bounding motion of the suspension member causing increasing of the fluid pressure in the fluid chamber 15d, the pressurized fluid flows from the fluid chamber 15d to the low pressure accumulator 22L via the branch line 22B and the throttle valve 22V. Since the throttle valve 22V has a given throttling rate to limit fluid flow therethrough, this flow resistance serves as damping force for absorbing vibration energy so that the vibration energy is not transmitted to the vehicle body.

On the other hand, when nose-dive occurs due to a vehicular braking operation, the front end of the vehicle body is lowered. At this time, since the vibration frequency of the pitching motion, i.e. nose-dive, of the vehicle body is normally lower than the border frequency $f_0$ Therefore, the flow resistance of the first hydraulic system. On the other than that of the second hydraulic system. On the other hand, lowering of the front end of the vehicle body is detected by the bounding and rebounding acceleration sensors 29FL and 29FR. The bounding and rebounding acceleration sensors 29FL and 29FR thus output the positive values of bounding and rebounding acceleration indicative sensor signals. The controller 30 integrates the bounding and rebounding acceleration indicative sensor signal values $\alpha_{FL}$ and $\alpha_{FR}$ to derive the bounding and rebounding stroke speed indicative value $V_{SFL}$ and $V_{SFR}$. Based on the bounding and rebounding stroke speed indicative value $V_{SFL}$ and $V_{SFR}$. the controller outputs the suspension control signal having values corresponding thereto. By the suspension control signal, the solenoid coils 22b of the proportioning solenoids 22 are energized at greater a magnitude to cause downward movement, of the actuation rods 22a. This increases the induction rate of the pressurized fluid from the fluid source 20 to the fluid chamber 15d of the hydraulic cylinder 15A. This increases the stiffness of the suspension system to suppress lowering motion of the front end of the vehicle body. Therefore, nose-dive in response to the vehicular braking operation can be successfully prevented. It can thus be seen that the second pressure adjusting means includes a second flow restricting means for restricting flow between the variable pressure chamber and the pressure control valve 18 which defines a valve means.

On the other hand, when winding up occurs due to abrupt acceleration of the vehicle, the front end of the vehicle body is lifted up. In response to rising of the front end of the vehicle body, the bounding and rebounding acceleration sensors 29FL and 29FR output the negative values of bounding and rebounding acceleration indicative signals $\alpha_{FL}$ and $\alpha_{FR}$. Therefore, the bounding and rebounding stroke speed indicative values $V_{SFL}$ and $V_{SFR}$ based on the bounding and rebounding acceleration indicative sensor signals. This bounding and rebounding stroke speed indicative value is output to the solenoid coils 22b as the suspension control signals. Therefore, the energization magnitude of the solenoid coils is reduced to cause upward shifting of the actuation rods 22a. This reduces the supply rate of the working fluid and causes draining of the working fluid in the fluid chamber 15d. As a result, the front-left and front-right suspension systems are softened to suppress upward motion of the front end of the vehicle body.

On the other hand, when the vehicle body causes bouncing by running over a projection or dent on the road, the balance between the spring force of the bias spring 22d and the fluid pressure in the pressure control chamber 18k is destroyed due to variation of the fluid pressure at the outlet port 18d. This causes shifting of the valve spool 19 to absorb the vibration energy for suppressing bouncing action of the vehicle body.

As will be appreciated herefrom, the embodiment shown avoids consumption of the fluid pressure to be generated in the pressurized fluid unit 20a for absorbing relatively high frequency vibration such as road shock. This will reduce the necessity for driving the engine-driven fluid pump 15n the pressurized fluid source, unit to reduce the engine load. This will improve fuel economy while driving the vehicle.

Figure 7:
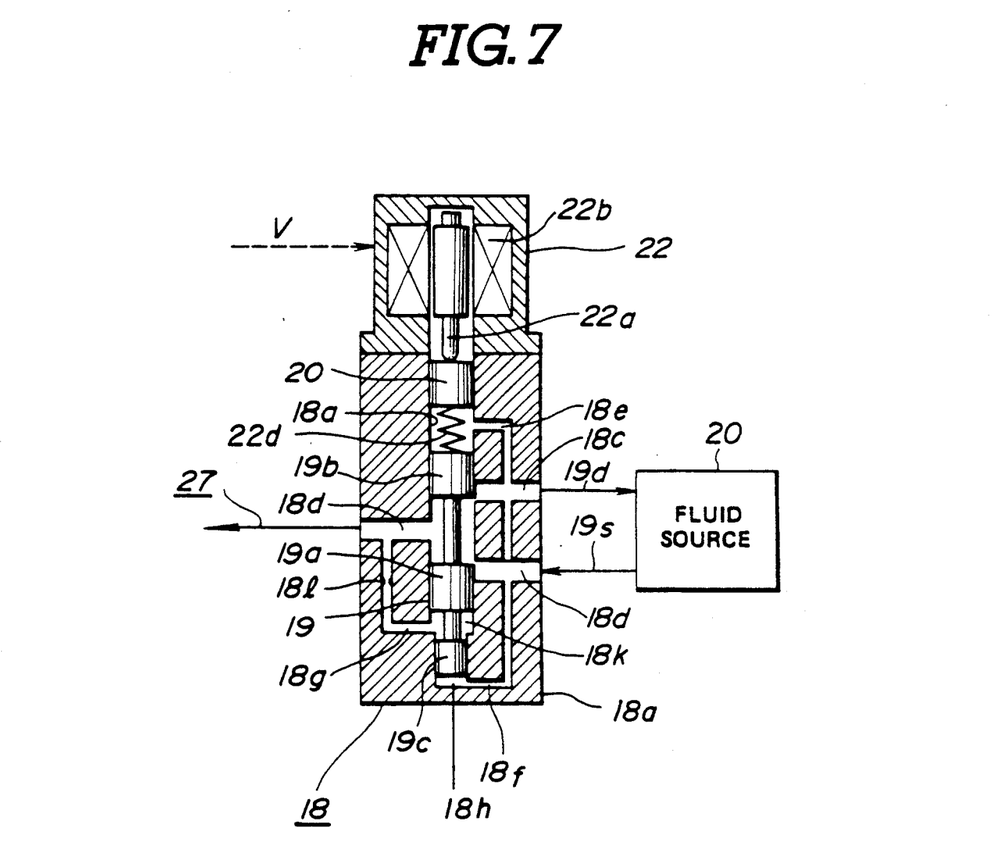
FIG. 7 is a section similar to FIG. 5 but showing a modified construction of the hydraulic pressure control valve to be employed in the actively controlled suspension system of FIG. 1.

The embodiment shown provides a flow resistance difference between the first hydraulic system and the second hydraulic system by adjusting the length and path area of the communication path 27. However, the difference of in the working fluid flow characteristics as required can be obtained in various ways. Therefore, the invention should not be limited to providing flow resistance difference between the first and second hydraulic systems in the construction set forth above, One of the examples of the modified hydraulic circuit for providing the equivalent flow resistance difference has been illustrated in FIG. 7. In the modification of FIG. 7, an orifice 18l is formed in the pilot path 18g connecting the pressure control chamber 18k and the outlet port 18c. The throttling rate in the orifice is set to provide fluid flow characteristics to increase flow resistance in the first hydraulic system according to an increasing vibration frequency, With this construction, by providing an appropriate throttling rate in the orifice 18l, the fluid flow characteristics act to increase the flow resistance $C_2$ across that $C_1$ of the second hydraulic system when the vibration frequency increases across the border frequency $f_0$.

As will be appreciated herefrom, according to the embodiment shown, since the first hydraulic system is active for absorbing the high frequency vibration, such as road shock, responsibility responses to input of the shock is substantially high to successfully prevent the vibration from being transmitted to the vehicle body. On the other hand, since the second hydraulic system is active only upon the low frequency vibration which is caused in response to rolling, pitching, bouncing and so forth, wasting of engine driving torque for driving the fluid pump in the pressurized fluid source unit can be minimized.

It should be noted that, although the present invention has been disclosed in terms of the preferred embodiment of the invention which has been directed to an active suspension system employing a hydraulic cylinder, the invention should be applicable for any type of suspension system which is adjustable as to damping characteristics, such as a pneumatic suspension system, a hydropneumatic suspension system and so forth.

What is claimed is:

1. An actively controlled suspension system for an automotive vehicle comprising:
    a suspension assembly interposed between a vehicle body and a suspension member rotatingly supporting a road wheel, said suspension assembly including a variable pressure chamber, a pressurized fluid source connected to said assembly via a circuit including a pressure control unit, acceleration sensors, and high pressure accumulators;
    first pressure adjusting means, coupled to said variable pressure chamber and responsive to vibration input from said suspension member, for adjusting pressure in said variable pressure chamber for absorbing variation energy input to said suspension assembly, said first pressure adjusting means including allow pressure accumulator connected to said variable pressure chamber and first flow restriction means interposed between said variable pressure chamber and said low pressure accumulator for limiting flow of said fluid for absorbing said vibration energy; and
    second pressure adjusting means, coupled to said variable pressure chamber and responsive to vibration input from said vehicle body, for adjusting pressure in said variable pressure chamber for suppressing an attitude change of said vehicle body, said second pressure adjusting means including said pressurized fluid source, said circuit connecting said pressurized fluid source to said variable pressure chamber, valve means for adjusting flow of pressurized fluid, and an electronic controller detecting an attitude change of said vehicle body for operating said valve means for adjusting fluid pressure in said variable pressure chamber for suppressing said attitude change of said vehicle body,
    said second adjusting means further including a second flow restriction means for restricting fluid flow between said variable pressure chamber and said valve means, said second flow restriction means having a flow restriction create which is variable depending upon the frequency of said vibration input from said vehicle body so that said variable flow restriction rate becomes greater than a flow restriction rate of said first flow restriction means when said frequency is higher than a given valve.

2. An actively controlled suspension system as set forth in claim 1, wherein said given value is set at a border frequency between a resonance frequency of said vehicle body and a resonance frequency of said suspension member as coupled with said road wheel.

3. An actively controlled suspension system as set forth in claim 2, wherein said electronic controller si connected to a detector for detecting a change of attitude of said vehicle body to produce an attitude change indicative signal indicative of a magnitude of change of attitude, and wherein said electronic controller derives a control signal value for controlling said valve means to control fluid pressure in said variable pressure chamber.

4. An actively controlled suspension system as set forth in claim 3, wherein said acceleration sensors monitor bounding and rebounding acceleration of said vehicle body for producing a bounding and rebounding acceleration indicative signal.

5. An actively controlled suspension system as set forth in claim 4, wherein said electronic controller integrates said bounding and rebounding acceleration indicative signal for obtaining a bounding and rebounding motion indicative value to derive said control signal value based thereon.

6. An actively controlled suspension system for an automotive vehicle comprising:
    a suspension assembly interposed between a vehicle body and a suspension member rotatingly supporting a road wheel, said suspension assembly including a variable pressure chamber, a pressurized fluid source connected to said assembly via a circuit including a pressure control unit, acceleration sensors, and high pressure accumulators;
    first pressure adjusting means, connected to said variable pressure chamber via a first path, said first path having a first flow restriction means disposed therein for limiting fluid flow therethrough and, said first flow restriction means being responsive to vibration input from said suspension member, for adjusting pressure in said variable pressure chamber for absorbing vibration energy input to said suspension assembly, said first pressure adjusting means including a low pressure accumulator a connected to said variable pressure chamber, and wherein said first flow restriction means is interposed between said variable pressure chamber and said low pressure accumulator for limiting flow of said fluid for absorbing said vibration energy; and
    second pressure adjusting means connected to said variable pressure chamber via a second path and including valve means for adjusting flow of pressurized fluid and a second flow restriction means for limiting fluid flow between said valve means and said variable pressure chamber to a value which is variable depending upon a vibration frequency of input vibration in such a manner that said second flow restriction value is smaller than a restriction value of said first flow restriction mans when said vibration frequency is lower than a given frequency threshold and becomes greater than or equal to said restriction value of said first flow restriction means when said vibration frequency increases across said frequency threshold, said second pressure adjusting means being responsive to vibration having a frequency lower than said frequency threshold for adjusting pressure in said variable pressure chamber for suppressing change of vehicular attitude, said second pressure adjusting means further comprising said pressurized fluid source, said circuit connecting said pressurized fluid source to said variable pressure chamber, and an electronic controller detecting an attitude change of said vehicle body for operating said valve means for adjusting fluid pressure in said variable pressure chamber for suppressing attitude change of said vehicle body.

7. An actively controlled suspension system as set forth in claim 6, wherein said frequency threshold is set at a border frequency between a resonance frequency of said vehicle body and a resonance frequency of said suspension member as coupled with said road wheel.

8. An actively controlled suspension system as set forth in claim 7, wherein said electronic controller is connected to a detector detecting a change of attitude of said vehicle body to produce an attitude change indicative signal indicative of a magnitude of change of attitude, and wherein said electronic controller derives a control signal value for controlling said valve means to control fluid pressure in said variable pressure chamber.

9. An actively controlled suspension system as set forth in claim 8, wherein said acceleration sensors monitor bounding and rebounding acceleration of said vehicle body for producing a bounding and rebounding acceleration indicative signal.

10. An actively controlled suspension system as set forth in claim 9, wherein said electronic controller integrates said bounding and rebounding acceleration indicative signal value for obtaining a bounding and rebounding motion indicative value to derive said control signal value based thereon.

11. An actively controlled suspension system for an automotive vehicle comprising:
   a suspension assembly interposed between a vehicle body and a suspension member rotatingly supporting a road wheel, said suspension assembly including a variable pressure chamber, a pressurized fluid source connected to said assembly via a circuit including a control unit, acceleration sensors, and high pressure accumulators;
   first pressure adjusting means, connected to said variable pressure chamber via a first path provided with a predetermined first flow restriction value for limiting fluid flow therethrough and responsive to vibration input from said suspension member, for adjusting pressure in said variable pressure chamber for absorbing vibration energy input to said suspension assembly said first pressure adjusting means including a low pressure accumulator connected to said variable pressure chamber and a first flow restricting means, interposed between said variable pressure chamber and said low pressure accumulator, for providing said first flow restriction value for limiting flow of said fluid for absorbing said vibration energy; and
   second pressure adjusting means, connected to said variable pressure chamber via a secondpath, said second pressure adjusting means including valve means for adjusting flow of pressurized fluid and second flow restriction mans for limiting fluid flow between said variable pressure chamber and said valve means to a value which is variable depending upon the frequency of input vibration in such a manner that said second flow restriction value is smaller than said first restriction value when said vibration frequency is lower than a given frequency threshold and becomes greater than or equal to said first restriction value when said vibration frequency increases across said frequency threshold, said second pressure adjusting means including an actuator means for adjusting said fluid pressure in said variable pressure chamber, said second pressure adjusting means including said pressurized fluid source, said circuit connecting said pressurized fluid source to said variable pressure chamber, and an electronic controller detecting an attitude change of said vehicle body for operating said valve means for adjusting fluid pressure in said variable pressure chamber for suppressing attitude change of said vehicle body.

12. An actively controlled suspension system as set forth in claim 11, wherein said frequency threshold is set at a border frequency between a resonance frequency of said vehicle body and a resonance frequency of said suspension member as coupled with said road wheel.

13. An actively controlled suspension system as set forth in claim 12, wherein said electronic controller is connected to a detector detecting a change of attitude of said vehicle body to produce an attitude change indicative signal indicative of a magnitude of change of attitude, and said controller derives a control signal value for controlling said value means to control fluid pressure in said variable pressure chamber.

14. An actively controlled suspension system as set forth in claim 13, wherein said for acceleration sensors monitor bounding and rebounding acceleration of vehicle body for producing a bounding and rebounding acceleration indicative signal.

15. An actively electronic controlled suspension system as set forth in claim 14, wherein said electronic controller integrates said bounding and rebounding acceleration indicative signal for obtaining a bounding and rebounding motion indicative value to derive said control signal value based thereon.

16. An actively controlled suspension system for an automotive vehicle comprising:
   a suspension assembly interposed between a vehicle body and a suspension member rotating supporting a road wheel, said suspension assembly including a variable pressure chamber filled with a working fluid;
   a hydraulic circuit including pressurized fluid source means fr supplying pressurized working fluid therefrom and recirculating said pressurized fluid there into, said hydraulic circuit establishing fluid communication between said variable pressure chamber and said pressurized fluid source means;
   first pressure adjusting means, disposed within said hydraulic circuit between said variable pressure chamber and said pressurized working fluid source means for selectively establishing and blocking fluid communication therebetween said first pressure adjusting means being responsive to relative displacement between said vehicle body and said suspension member for adjusting fluid pressure in said variable pressure chamber for suppressing attitude chamber of said vehicle body, said first pressure adjusting means including first flow restriction means for limiting flow of said fluid for absorbing said vibration energy; and
   second pressure adjusting means, coupled to said variable pressure chamber and responsive to vibration input from said vehicle body, for adjusting pressure in said variable pressure chamber for suppressing an attitude chamber of said vehicle body, said second pressure adjusting means including said pressurized fluid source, valve means for adjusting flow of pressurized fluid, and an electronic controller detecting an attitude change of said vehicle body for operating said valve means for adjusting fluid pressure in said variable pressure chamber for suppressing said attitude change of said vehicle body, said second adjusting means further including a second flow restriction means for restricting fluid flow between said variable pressure chamber and said valve means, said second flow restriction means having a flow restriction rate which ids variable depending upon the frequency of said vibration input from said vehicle body so that said variable flow restriction rate becomes greater than a flow restriction rate of said first flow restrictions means when said frequency is higher than a given value.

17. A controlled suspension system for a vehicle having a vehicle body and suspension member means for rotatably supporting a road wheel, said body producing low frequency vibrations due to attitude changes in said vehicle and said suspension member means producing high frequency vibrations due to bounding changes in said road wheel, said system comprising:
    a controlled pressure suspension assembly including variable pressure fluid chamber means, containing fluid under pressure, for coupling said body to said suspension member means;
    first means, responsive to said high frequency vibrations, for producing high frequency compensation for said bounding changes, said first means being connected to said variable pressure fluid chamber means and means and including means for selectively operating in response to said high frequency vibrations for providing restricted flow of said fluid from said chamber means to permit absorption of high frequency vibration energy to provide said high frequency compensation for said bounding changes; and
    second means, responsive to said low frequency vibrations, for providing low frequency compensation for said attitude chambers, said second means being connected to said variable pressure fluid chamber chamber means and including
    controlled means for selectively operating in response to said low frequency vibrations for providing controlled adjustment of fluid flow to and from said chamber means to adjust fluid pressure in said chamber means to provide said low frequency compensation for said attitude changes.

18. A system as claimed in claim 17, wherein said means for providing restricted flow includes
    low pressure accumulator means,
    branch line means for coupling said chamber means to said accumulator means, said branch line means including flow restricting means selectively operating for limiting to a given value flow of said fluid from said chamber means to said accumulator means and said controlled means includes controller means, responsive to said low frequency vibrations, for providing a control signal, pressurized fluid source means for supplying said fluid, fluid circuit means for coupling said chamber means to said pressurized fluid source means, said fluid circuit means including valve means, responsive to said control signal, for adjusting flow of said fluid between said pressurized fluid source means.

19. an actively controlled suspension system for an automotive vehicle comprising:
    a suspension assembly interposed between a vehicle body and a suspension member rotatingly supporting a road wheel, said suspension assembly including a variable pressure chamber, a pressurized fluid source connected to said assembly via a circuit including a control unit, an acceleration sensor, and a high pressure assimilator;
    a first flow restriction means, connected to said variable pressure chamber, for compensationg for variation of fluid pressure in said variable pressure chamber by absorbing vibration energy causing variation of fluid pressure in said variable pressure chamber; and
    second flow restriction means, disposed in said circuit, for adjusting fluid pressure in said pressure chamber, said second flow restriction means including a valve means associated with an electrically operable actuator for controlling valve position in response to an atittude chamber suppressing control signal from said control unit, which atittude chamber suppressing control signal is produced in response to a vehicular driving condition monitored by said acceleration sensor;
    said second flow restricting means providing a greater flow restriction than the flow restriction provided by said first flow restriction means in response to a vibration at a frequency higher than a predetermined vibration frequency criterion for absorbing high frequency vibration input from said suspension member and said first flow restriction means providing a greater flow restriction than the restriction provided by said second flow restriction means in respone to the vibration having a frequency below said vibration criterion for damping vibrations to suppress attitude chamber of the vehicular body.

20. An actively controlled suspension system as set forth in claim 19, wherein said firt restriction means provides a flow restriction that is constant at all frequencies and said second restriction means provides a flow restriction that increases hyperbolically with increasing frequency.

* * * * *